United States Patent

Müller et al.

[11] Patent Number: 5,778,726
[45] Date of Patent: Jul. 14, 1998

[54] DEVICE FOR MONITORING A PREDETERMINED LEVEL OF A LIQUID IN A CONTAINER

[75] Inventors: Roland Müller, Steinen; Winfried Maier, Maulburg; Rolf Schwald, Schopfheim, all of Germany

[73] Assignee: Endress + Hauser GmbH + Co., Maulburg, Germany

[21] Appl. No.: 733,098

[22] Filed: Oct. 16, 1996

[30] Foreign Application Priority Data

Oct. 17, 1995 [DE] Germany .................. 195 38 677.9

[51] Int. Cl.6 .................................................. G08B 21/00
[52] U.S. Cl. ................... 73/290 V; 340/621; 367/165; 367/908; 181/124
[58] Field of Search ....................... 73/290 V, 866.5; 340/618, 621; 367/157, 159, 162, 163, 165, 908; 181/124

[56] References Cited

U.S. PATENT DOCUMENTS

| | | |
|---|---|---|
| 3,296,586 | 1/1967 | Midlock et al. ............... 367/157 |
| 4,107,994 | 8/1978 | Sogo ............................. 73/290 V |
| 4,242,744 | 12/1980 | Rottmar . | 
| 4,668,945 | 5/1987 | Aldrovanfi et al. ........... 73/290 V |
| 4,779,246 | 10/1988 | Dietzsch et al. .............. 367/165 |
| 4,850,213 | 7/1989 | Steinebrunner et al. ..... 73/290 V |
| 5,201,222 | 4/1993 | Johnson ........................ 73/290 V |
| 5,264,831 | 11/1993 | Pfeiffer ......................... 73/290 V |
| 5,363,341 | 11/1994 | Schwald et al. .............. 73/290 V |
| 5,438,868 | 8/1995 | Holden et al. ................ 367/908 |
| 5,586,085 | 12/1996 | Lichte ........................... 73/290 V |

FOREIGN PATENT DOCUMENTS

| | | |
|---|---|---|
| 34 31 741 | 3/1986 | Germany . |
| 42 40 690 | 9/1993 | Germany . |
| 95/12804 | 5/1995 | WIPO . |

*Primary Examiner*—Scott Cummings
*Attorney, Agent, or Firm*—Bose McKinney & Evans

[57] ABSTRACT

For monitoring a predetermined level of a liquid in a container an ultrasonic sensor is fitted on the outer surface of the container wall at a measurement point situated at the height of the level to be monitored, said sensor containing an ultrasonic transducer having a diaphragm in contact with the container wall. The components of the ultrasonic sensor including those of the ultrasonic transducer are grouped together in a sensor block which is releasably connected to an adapter secured to the container wall, this adapter being configured so that it can be secured in any way required to containers of differing shape and/or material.

12 Claims, 7 Drawing Sheets

DEVICE FOR MONITORING A PREDETERMINED LEVEL OF A LIQUID IN A CONTAINER

BACKGROUND OF THE INVENTION

The invention relates to a device for monitoring a predetermined level of a liquid in a container comprising an ultrasonic sensor fitted on the outer surface of the container wall at a measurement point situated at the height of the level to be monitored and containing an ultrasonic transducer having a diaphragm in contact with the container wall.

In assemblies of this kind it is necessary to attach the ultrasonic sensor to containers of differing shape and/or differing materials. It is known, for example, from the PCT publication WO 95/12804 to secure an ultrasonic sensor to the container by means of a clamping strap, collet or adhesive tapes, the ultrasonic sensor being specially configured for each of these types of fastening. Apart from this, these types of fastening are specially devised for small containers, particularly for medical applications and which are not suitable for fastening to large containers under rough conditions, especially in industrial environments.

SUMMARY OF THE INVENTION

The object of the invention is to provide a device of the aforementioned kind in which the ultrasonic sensor may be secured to containers of differing shape and size as well as of differing materials by means which are an optimum in each case without necessitating any modifications in design of the ultrasonic sensor.

For achieving this object the assembly according to the invention includes an adapter which is configured so that it can be secured to containers of differing shape and/or differing materials in any way required, and a sensor block which contains the components of the ultrasonic sensor including those of the ultrasonic transducer and is releasably connected to the adapter secured to the container wall.

In the arrangement according to the invention the adapter is first secured to the desired location on the container wall without the sensor block. This may be done in several, different ways, of which the one most favorable for the shape and material of the container concerned is selected in each case. The adapter is configured so that it can be applied to both a flat and a curved container wall. It is not until the adapter is secured to the container that the sensor block is connected to the adapter. Accordingly, the sensor block may be always configured the same irrespective of the shape, size and material of the container and irrespective of the selected way in which it is to be secured. Even in a special instance, should the same adapter not be suitable for a certain container, merely the adapter needs to be modified in design, which is possible by simple means and at little expense, whilst the sensor block can always remain unchanged.

An advantageous embodiment of the invention consists of the adapter comprising a frame adapted to the contour of the sensor block, which frame is provided on the side facing the container wall with a seal running around the periphery. The seal protects the place of contact between the diaphragm of the ultrasonic transducer and the container wall from water splash and other influences.

Advantageous embodiments and further aspects of the invention are characterized in the sub-claims.

BRIEF DESCRIPTION OF THE DRAWING

Further features and advantages of the invention are evident from the following description of an example embodiment with reference to the drawings in which.

DESCRIPTION OF THE PREFERRED EMBODIMENT

Figure 1:
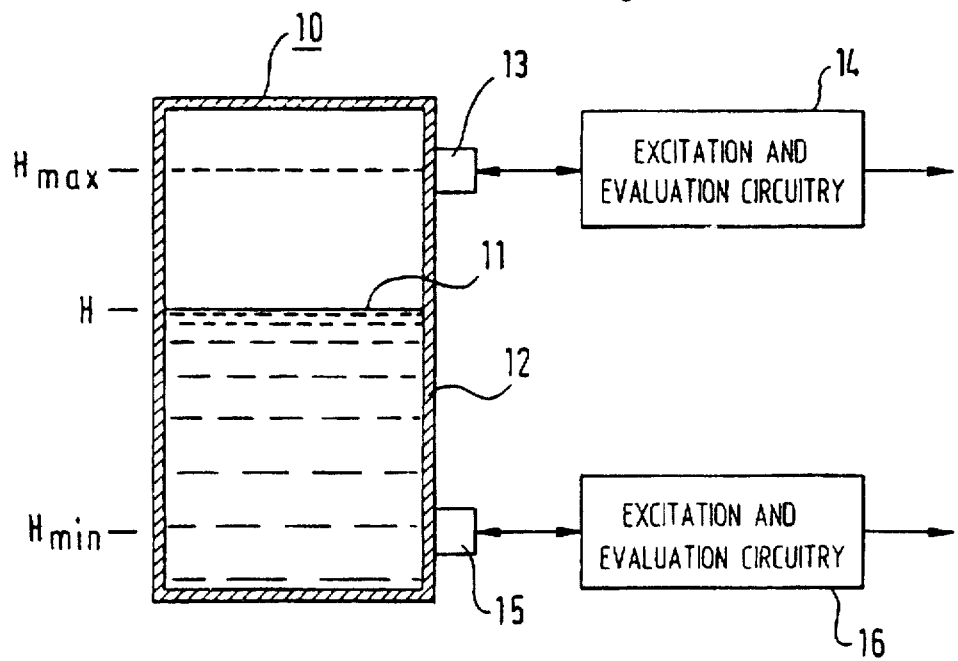
FIG. 1 is a schematic illustration for explaining the monitoring of predetermined levels of a liquid in a container.

FIG. 1 shows a container 10 which is filled up to a level H with a liquid 11. The level H at which the surface of the liquid 11 is located above the bottom of the container 10, is the momentary level in the container. The level is required not to exceed a maximum level $H_{max}$ and not to drop below a minimum level $H_{min}$. Each of these limit values of the level is also termed "limit level".

Attached to the outer surface of the container wall 12 for monitoring the upper limit level $H_{max}$ is a level sensor 13 which is connected to an excitation and evaluation circuitry 14. Attached to the outer surface of the container wall 12 for monitoring the lower limit level $H_{min}$ is a level sensor 15 which is connected to an excitation and evaluation circuitry 16. Each of the two sensors 13 and 15 is configured so that with the aid thereof it can be defined through the container wall 12 whether the liquid 11 in the container 10 is at the level of the sensor 13 and 15, respectively, or not. For this purpose each of the two sensors 13 and 15 is configured as an ultrasonic sensor which is able, when excited by an electrical alternating voltage pulse furnished by the corresponding excitation and evaluation circuitry 14 and 16, respectively, to send an ultrasonic pulse to the container wall 12 and to convert received ultrasonic signals into electrical alternating voltage signals which are transferred to the circuitry 14 and 16, respectively. The circuitry 14 and 16, respectively, evaluates the received signals and provides at the output a signal which indicates whether the level in the container 10 lies above or below the limit level to be monitored. To establish this it is thus not necessary to provide an opening in the container wall 12 or to introduce the sensor into the interior of the container 10. It is for this reason that the sensors 13 and 15 are also not in direct contact with the liquid 11.

The two sensors 13 and 15 as well as the associated electronic circuitries 14 and 16, respectively, are configured absolutely identical. Accordingly, in the following the description relates merely to the sensor 13 and the circuitry 14, this description applying just the same to the sensor 15 and the circuitry 16.

Figure 2:
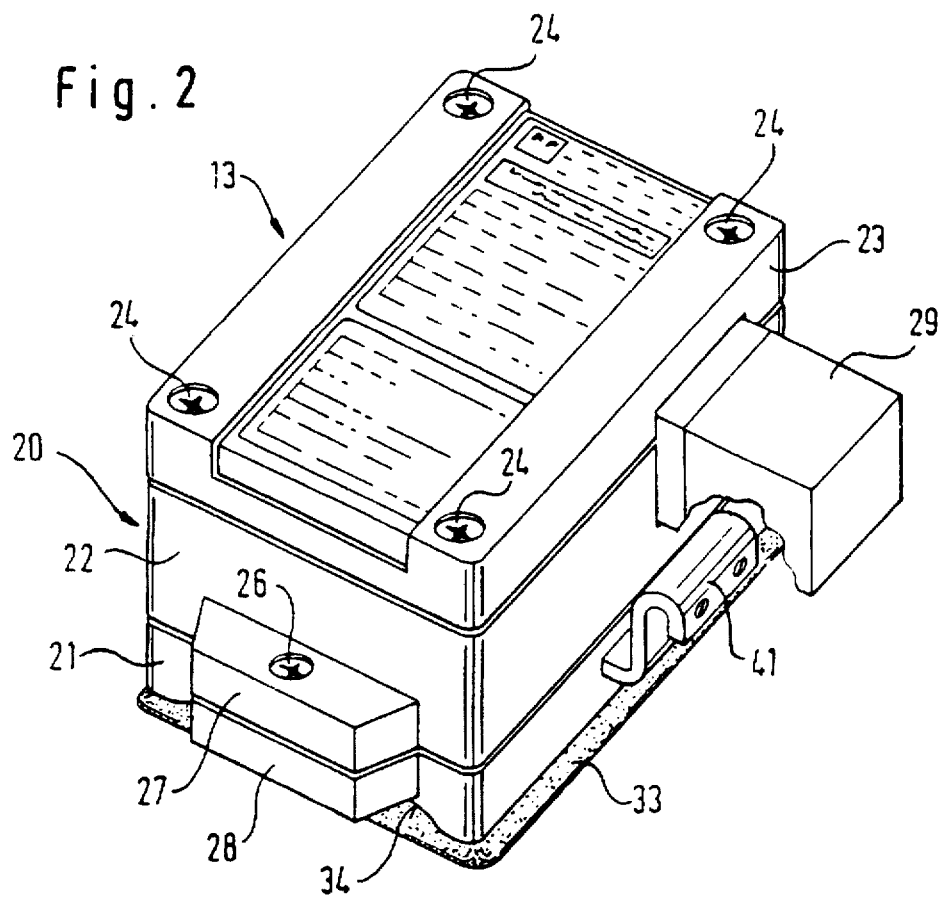
FIG. 2 is a perspective view of an embodiment of the ultrasonic sensor used in the invention.
Figure 3:
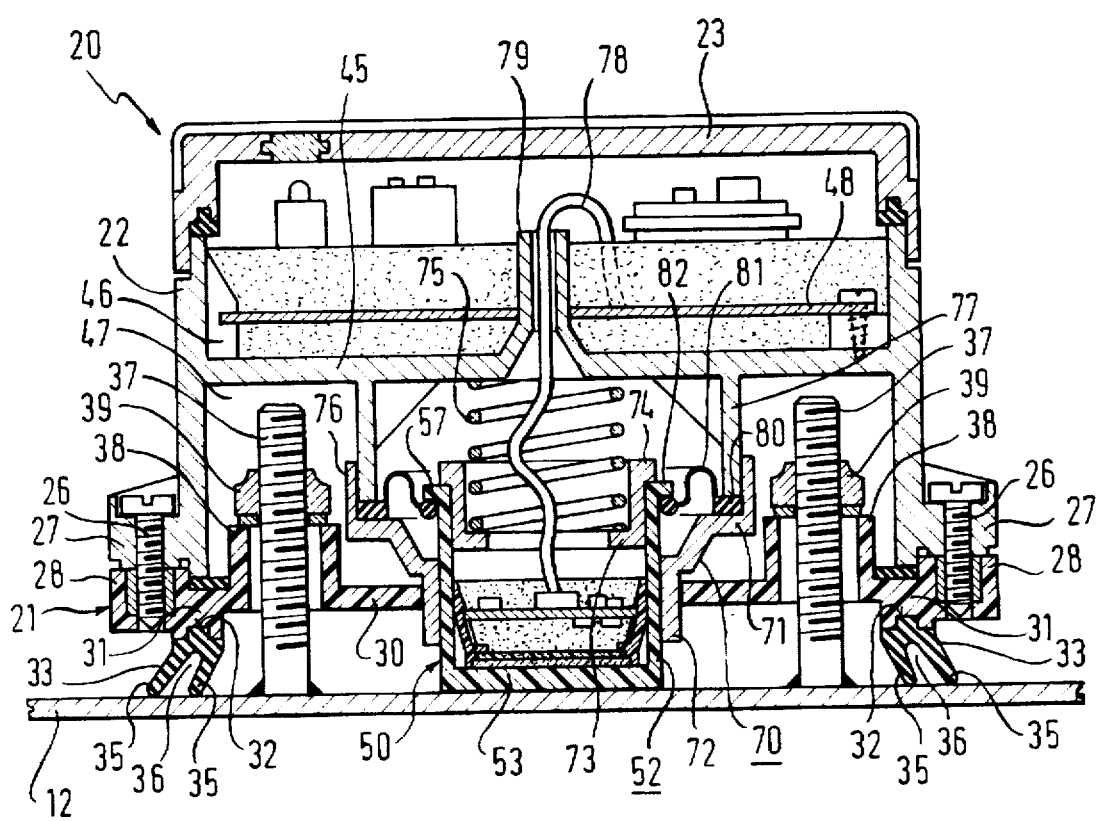
FIG. 3 is a longitudinal section through the ultrasonic sensor of FIG. 2 when attached to a flat container wall.

FIG. 2 shows a perspective view of the sensor 13, and the FIGS. 3 and 4 show section views of the sensor 13 secured to the container wall 12. FIG. 3 shows a longitudinal section of the sensor 13 for the case that the container wall is flat, and FIG. 4 shows a transverse section through the sensor for the case that the container wall is cylindrical. The excitation and evaluation circuitry 14, which in FIG. 1 is illustrated separately from the the sensor 13 for the sake of clarity, is assembled together with the sensor 13 in the embodiment illustrated in FIGS. 2 to 4.

The sensor shown in FIG. 2 consists of a sensor block 20, containing all components of the ultrasonic sensor and the excitation and evaluation circuitry, and of an adapter 21 which serves to secure the sensor block 20 to containers of differing shape and size as well as of differing materials. The sensor block 20 has a sensor housing 22 which is closed off by a cover 23 secured to the sensor housing 22 by means of screws 24. The sensor block 20 is secured to the adapter 21 by means of screws 26 which pass through holes in the protuberances 27 on the narrow sides of the sensor housing 22 and are screwed into tappings in corresponding protuberances 28 on the adapter 21. After having released the two screws 26 the complete sensor block can be removed from the adapter 21 secured to the container wall 12. Vice-versa for fitting a sensor, the adapter 21 is secured without the sensor block 20 to the desired location of a container wall by suitable means and subsequently the sensor block 20 with the ultrasonic sensor assembled ready for operation is mounted on the adapter 21 and secured by means of the screws 26. A terminal block 29 projecting from one side of the sensor housing 22 permits connecting the circuitry accommodated in the sensor housing 22 to outer connecting leads.

The adapter 21 is a plastics moulding substantially comprising a plate 30, the contour of which corresponds to the contour of the sensor housing 22, i.e. in the example shown, rectangular. Molded around the plate 30 is a frame 31 which is provided on the side facing the container wall with a groove 32 into which a seal 33 is inserted. On the longitudinal sides of the adapter 21, which in the case of a cylindrical container 10 rest on the container wall 12 along the generatrices, the frame 31 has a consistent height. On the transverse sides which in the case of a cylindrical container 10 rest on the container wall 12 along the periphery, the frame 31 includes a recess 34 in the shape of a circular arc as is evident in FIG. 2 on the front transverse side thereof. The radius of curvature of the recess 34 corresponds to the radius of the container wall 12 of a container 10 having the smallest diameter at which the adapter 21 is to be attached. When the ultrasonic sensor 13 is intended for containers, the nominal width (diameter) of which amounts to at least 200 mm, the radius of curvature of the recess 34 is thus 100 mm.

The seal 33 is configured so that its sealing surface intended for contact with the container wall lies in a plane when the adapter 21 is not yet applied to the container wall 12 and thus the seal 33 is still to change shape. So that this requirement is satisfied the seal 33 has a consistent height along the longitudinal sides of the frame 31, while its height in the region of each transverse side increases in keeping with the shape of the recess 34 in the shape of a circular arc towards the center. As evident from the FIGS. 3, 4(a) and 4(b) the seal 33 is preferably configured with two sealing lips 35, between which a notched recess 36 exists. The sealing lips 35 are relatively low along the longitudinal sides of the frame 31 (FIGS. 4(a) and 4(b)) and the depth of the notched recess 36 is at this location correspondingly small, whereas along the transverse sides of the frame 31 the height of the sealing lips 35 and the depth of the notched recess 36 increase to the same extent as the height of the seal 33. Since the section plane of the sectioned view of FIG. 3 passes through the locations at which the recesses 34 are deepest, the sealing lips 35 have in this section view a maximum height and the notched recesses 36 a maximum depth.

Figure 4A:
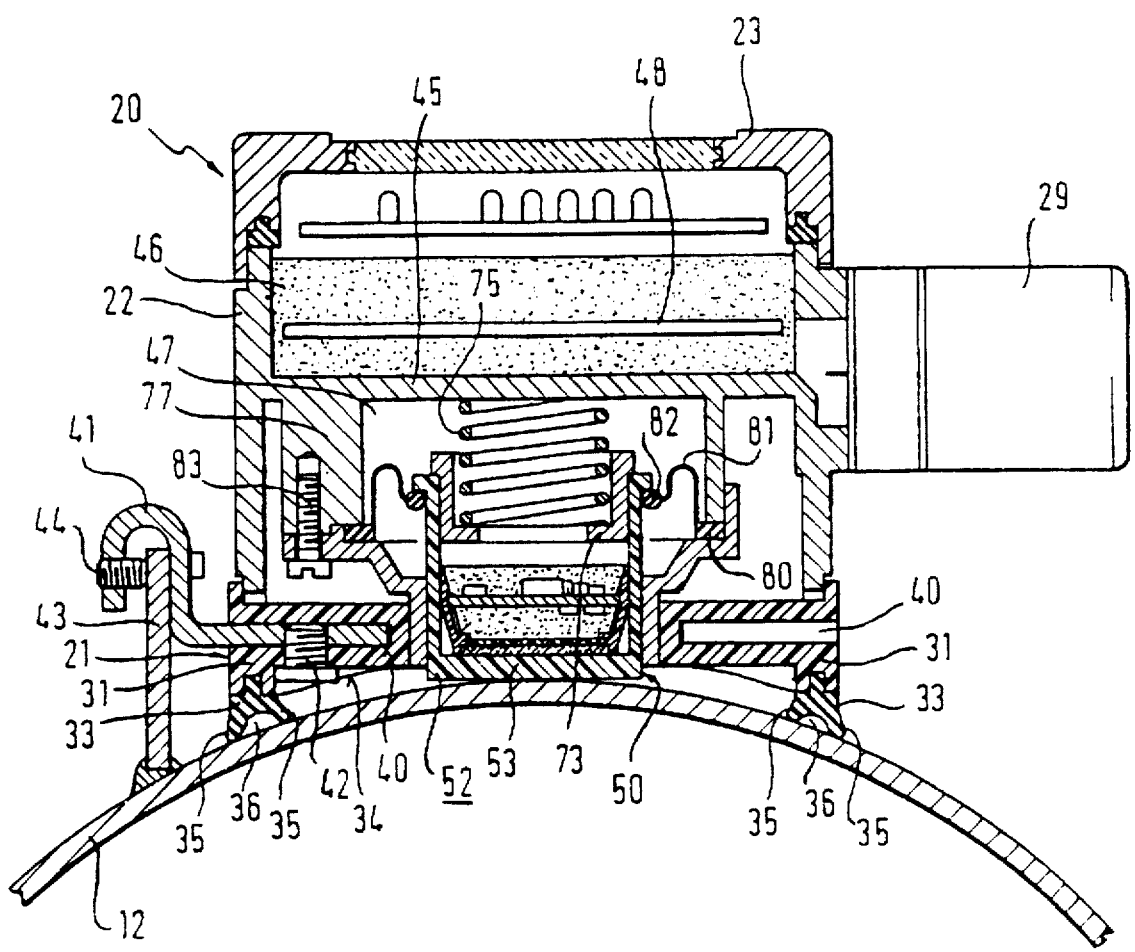
FIG. 4(a) is a cross-section through the ultrasonic sensor of FIG. 2 when attached to a cylindrical container wall showing an embodiment of the attachment.
Figure 4B:
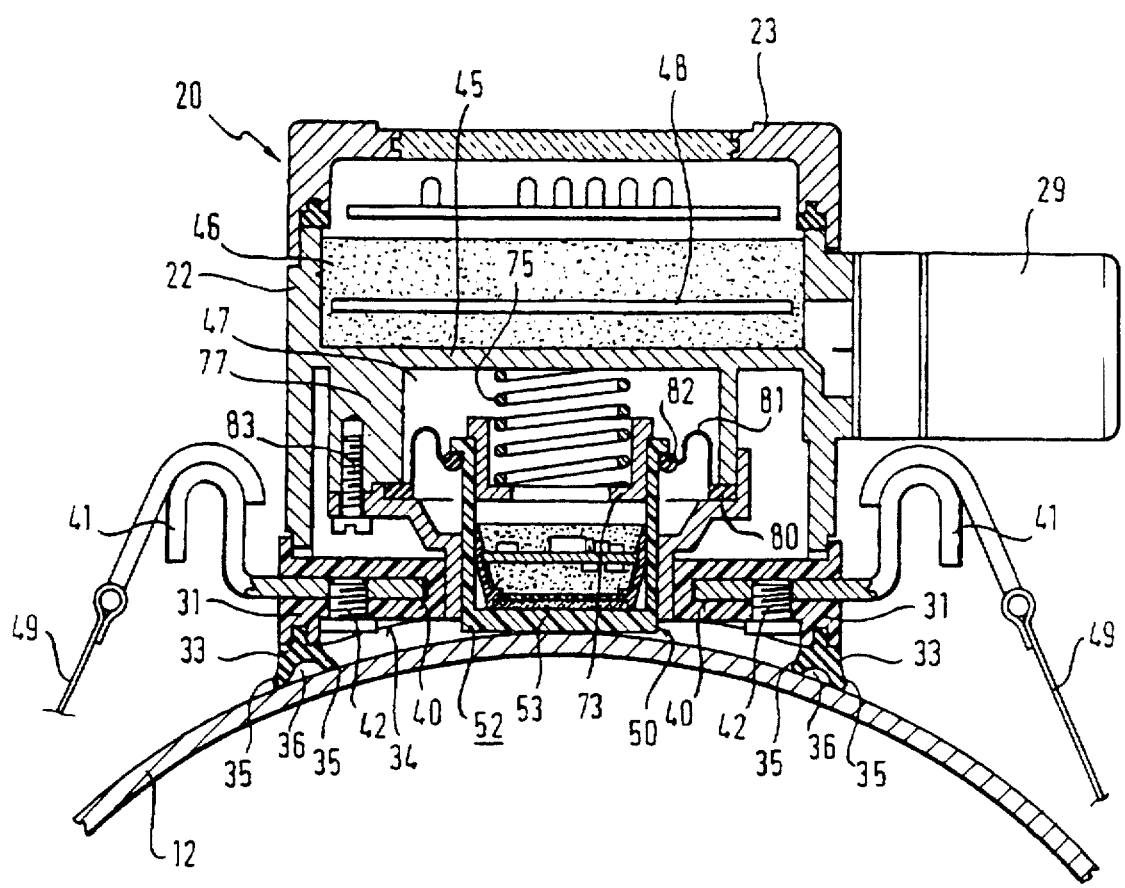
FIG. 4(b) is a cross-section through the ultrasonic sensor of FIG. 2 when attached to a cylindrical container wall showing another embodiment of the attachment.

When the adapter 21 is secured to a flat container wall 12 (FIG. 3) the sealing lips 35 are pressed together in the region of the recesses 34 to the same extent as in the region of the straight longitudinal sides of the frame 31, i.e. relatively slightly, whereas when the adapter 21 is secured to a cylindrical container wall 12 (FIGS. 4(a) and 4(b)), the sealing lips change shape more in the region of the recesses 34 than in the region of the straight longitudinal sides of the frame 31, i.e. all the more, the smaller the radius of curvature of the container wall is. This more pronounced change in shape is made possible by the greater height of the sealing lips 35 and the greater depth of the notched recess 36 in this region. In all cases, however, the sealing lips 35 are in sealing contact with the container wall along the entire periphery of the adapter 21.

The section view of FIG. 3 shows a first possibility of securing the adapter 21 to the container wall 12: welded to the container wall 12 are stud bolts 37 which protrude through the openings of bus hes 38 formed integrally with the plate 30 of the adapter 21. Screwed onto the ends of the stud bolts 37 protruding from the bushes 38 are nuts 39 which tension the plate 30 while pressing the seal 31 together against the container wall 12. If required, spacers protruding downwards to the container wall 12 may be formed on the plate 30 which determine a defined spacing of the plate 30 from the container wall 12 and thus a defined position of the adapter 21 as regards the container wall 12.

In FIG. 4(a) another way of securing the adapter 21 to the container wall 12 is illustrated. For this purpose one leg of an angular bracket 41 formed of heavy gauge sheet metal is inserted in a side slot 40 provided in the middle of each longitudinal side of the adapter 21 and secured therein by a screw 42. The other leg of the angular bracket 41, which is upswept at a right angle, is bent hook-shaped at the end. This hook-shaped bent end clasps a rail 43 which is welded to the container wall 12 and it is clamped firmly in place to the rail 43 by means of at least one screw 44. This kind of fastening permits defining the position at which the sensor 13 is to be applied to the container 10 by simple means and, where necessary, to subsequently change the position by shifting the adapter 21 along the rail 43.

It is shown in FIG. 4(b) that it is also possible to secure the adapter 21 by means of a clamping strap 49 placed around the container. For this purpose an angular bracket 41 is inserted in each of the slots 40 on both sides of the adapter 21 and hook-shaped brackets are hooked onto the bent upper end of the upswept legs of the two angular brackets 41, these brackets being provided at the ends of the clamping strap 49 placed around the container. Such a clamping strap fastening provides an even greater freedom of choice in selecting the location to apply the sensor 13 to the container 10 and has additionally the advantage that no intervention needs to be undertaken on the container itself. Hooking the clamping strap 49 into place at the two upper ends of the upswept legs of the angular bracket 41 results in the points at which the force exerted by the clamping strap 49 is applied lie relatively high on the adapter 21. This is of advantage because particularly in the case of containers having a large radius of curvature the components of the force pressing against the container significantly increase with the height of the point of application.

The stud bolts 37 or the rails 43 may be secured to the container wall 12 instead of by welding also by adhesive bonding, this type of securement of the adapter 21 also being suitable for containers of a plastics material.

The sensor housing 22 is divided into two spaces 46 and 47 by a transverse wall 45. In the outer space 46 facing away from the container wall 12 the excitation and evaluation circuitry 14 is accommodated which in the usual way is made up of electronic components which are mounted on a circuit board 48. In the inner space 47 facing the container wall 12 and the adapter 21 the components of the ultrasonic sensor 13 are fitted, to which in particular an electroacoustical transducer 50 belongs which serves to convert an alternating voltage pulse furnished by the excitation and evaluation circuitry into an ultrasonic pulse which is transferred to the container wall 12, and to convert ultrasonic vibrations which it receives from the container wall 12 into an electrical alternating voltage which is transferred to the excitation and evaluation circuitry.

Figure 5:
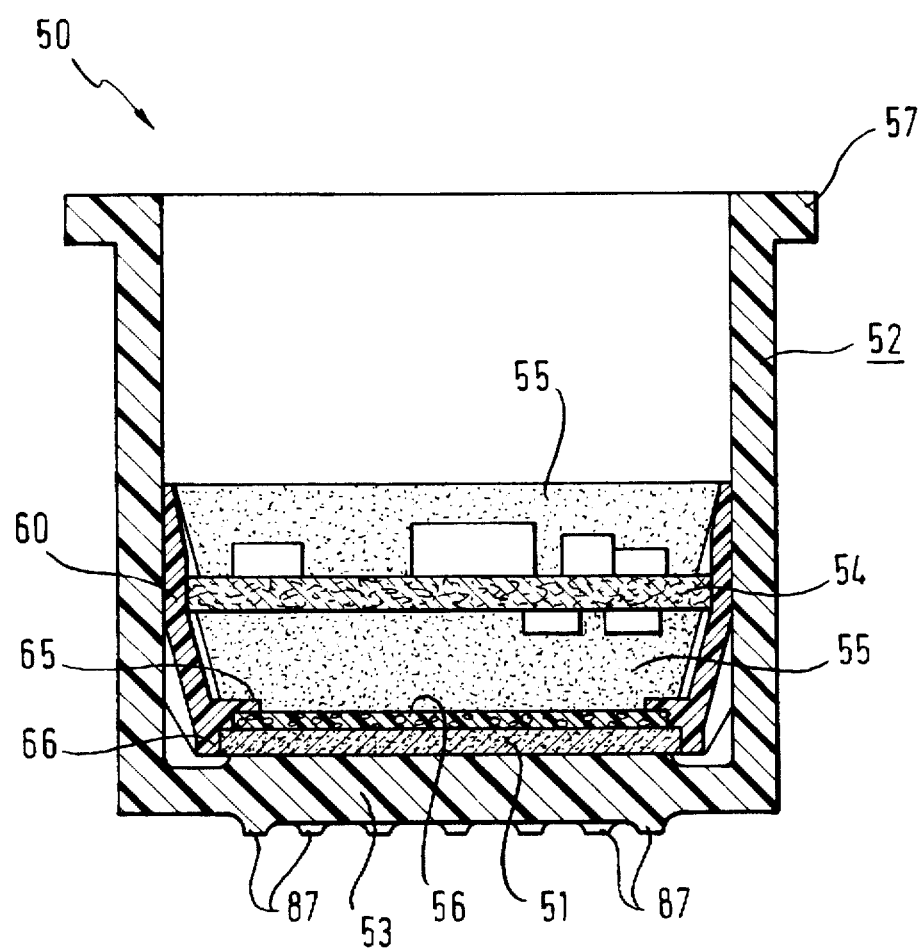
FIG. 5 is a section view of the ultrasonic transducer used in the ultrasonic sensor of FIGS. 2 to 4.

The electroacoustical transducer 50 is illustrated in more detail in FIG. 5. It contains as the active component a piezoelectric element 51 which in the known way is a slice of a piezoelectric crystal on both sides of which metallizations are applied which serves as electrodes. When an alternating voltage is applied to the electrodes, the piezoelectric crystal is excited to produce physical vibrations at the frequency of the alternating voltage, and when physical vibrations are transferred to the piezoelectric crystal it produces between the electrodes an alternating voltage having t he frequency of the physical vibrations. In FIG. 5 the electrodes are not illustrated since due to the minute thickness of the metallization as compared to the thickness of the piezoelectric crystal they are not visible.

The piezoelectric element 51 is arranged in the interior of a pot-shaped transducer housing 52 and is in contact with the bottom 53 of the transducer housing 52 which simultaneously forms the diaphragm of the ultrasonic transducer 50. The transducer housing 52 is made of a plastics material.

On the side of the piezoelectric element 51 facing away from the diaphragm 53 a circuit board 54 is arranged which carries the components of a circuit serving to couple the piezoelectric element 51 to the excitation and evaluation circuitry 14. The circuit board 54 is located spaced away from the piezoelectric element 51, and the space between the circuit board 54 and the piezoelectric element 51 is filled with a potting compound 55 which is filled in fluid condition and then solidifies. The side of the piezoelectric element 51 facing away from the diaphragm 53 is covered by a disk 56 of a closed-pore foamed material which prevents the potting compound 55 from coming into direct contact with the piezoelectric element 51. Also the space above the circuit board 54 is filled up to such a level with the potting compound 55 that all circuit components mounted on the circuit board 54 are embedded in the potting compound 55. The potting compound 55 is prescribed for reasons of explosion-protection, it in addition effecting dampening of ultrasonic waves emitted to the side opposite the diaphragm 53.

Figure 6:
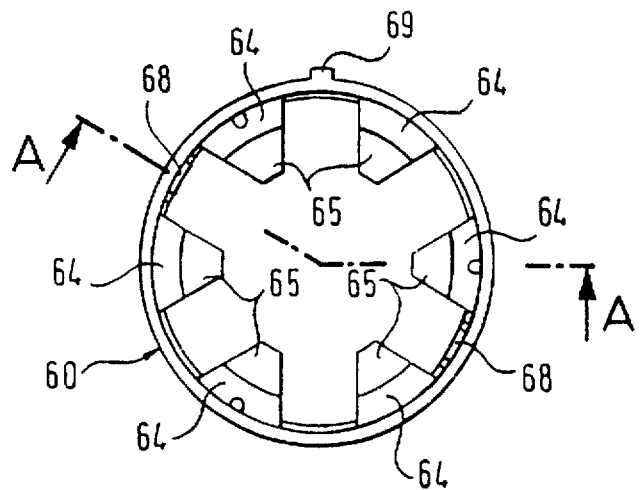
FIG. 6 is a plan view of a mounting sleeve used in the ultrasonic transducer of FIG. 5.
Figure 7:
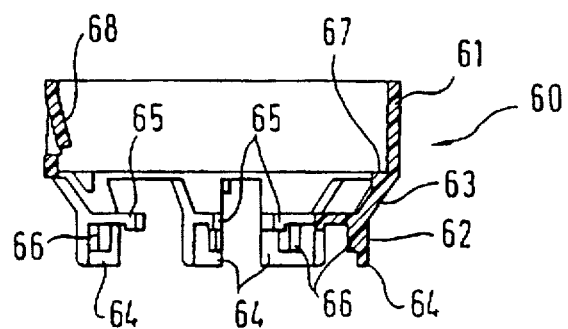
FIG. 7 is a section view of the mounting sleeve of FIG. 6.
Figure 8:
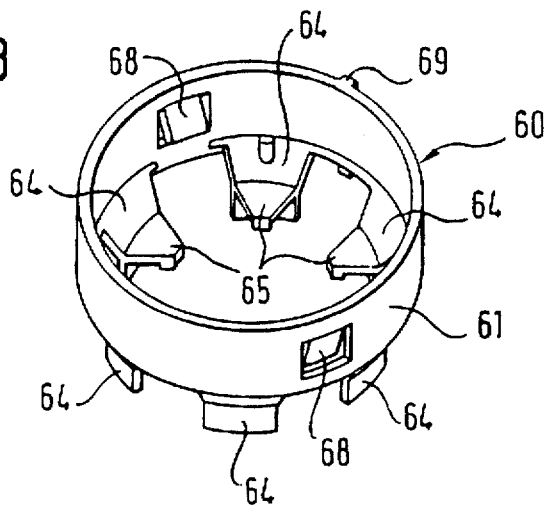
FIG. 8 is a perspective view of the mounting sleeve of FIGS. 6 and 7.

To facilitate installing the piezoelectric element 51 and the circuit board 54, as well as encapsulating these parts, a mounting sleeve 60 is provided which is illustrated in more detail in the FIGS. 6, 7 and 8. The mounting sleeve 60 is a molding of a plastics material which is shown in FIG. 6 in the plan view, in FIG. 7 in longitudinal section along the broken line A—A of FIG. 6 and in FIG. 8 in a perspective view. The mounting sleeve 60 has a widened cylindrical section 61, a narrowed cylindrical section 62 of smaller diameter and a conical section 63 between the two cylindrical sections 61 and 62. The outer diameter of the widened cylindrical section 61 corresponds to the inner diameter of the pot-shaped transducer housing 52, and the inner diameter of the narrower cylindrical section 62 corresponds to the diameter of the piezoelectric element 51. The narrower cylindrical section 62 and the conical transition section 63 are divided into six segments 64 by cutouts. At each segment 64, a paw 65 protruding radially inward is formed at the transition between the cylindrical section 61 and the conical section 63. Below each paw 65 an abutment nose 66 is formed which extends downwards only over a part of the height of the cylindrical section 62 and protrudes only slightly downwards radially. At the transition between the conical section 63 and the widened cylindrical section 61 a shoulder 67 is formed. In the wall of the widened cylindrical section 61 at each of two positions diametrally opposed to each other by cutouts a flexible latch 68 is formed, the free end of which protrudes slightly inwards and is located a distance away from the shoulder 67 which corresponds to the thickness of the circuit board 54. A rib 69 formed on the periphery of the widened cylindrical section 61 engages a corresponding groove in the transducer housing 52, as a result of which the mounting sleeve 60 is prevented from turning in the transducer housing 52.

The described configuration of the mounting sleeve 60 permits simple, speedy and precise assembly of the components of the ultrasonic transducer 50 outside of the transducer housing 52. The piezoelectric element 51 with the disk 56 of a closed-pore foamed material placed thereon is introduced into the narrowed cylindrical section 62 from underneath until the piezoelectric element 51 comes up against the ends of the abutment noses 66, thus precisely defining the radial and axial position of the piezoelectric element 51 in the mounting sleeve 60. The diameter of the foamed material disk 56 is somewhat smaller than the diameter of the piezoelectric element 51 and corresponds to the spacing between two abutment noses 66 located diametrally opposed to each other, and the thickness of the foamed material disk 56 corresponds to the height of the abutment noses 66. Accordingly, the paws 65 locate on the upper side of the foamed material disk 56 when the piezoelectric element 51 is introduced to abutment in the mounting sleeve 60, and the abutment noses 66 locate on the periphery of the foamed material disk 56. As a result of this the radial and axial position of the foamed material disk 56 is precisely defined in the mounting sleeve 60, and the foamed material disk 56 is maintained by the paws 65 in close contact with the upper side of the piezoelectric element 51.

The circuit board 54 is circular and has a diameter corresponding to the inner diameter of the widened cylindrical section 61 of the mounting sleeve 60. It is introduced from above into the widened cylindrical section 61 until it rests on the shoulder 67. During insertion the latches 68 are forced outwards by the peripheral edge of the circuit board 54 until the peripheral edge of the circuit board 54 has passed the ends of the latches 68. Then, due to their elasticity, the latches 68 snap back inwards so that they clasp the upper side of the circuit board 54 and hold the latter firmly on the shoulder 67, as a result of which the position of the circuit board 54 is fixed in the axial and radial direction in the mounting sleeve 60. The mounting sleeve 60 is then ready for being installed in the transducer housing 52. For this purpose a drop of a hot-curable adhesive is first applied to the bottom 53 of the transducer housing 52, and subsequently the mounting sleeve 60 is inserted into the transducer housing 52 until the piezoelectric element 51 comes into contact with the bottom 53, the adhesive thereby being distributed in a thin layer between the surfaces of the piezoelectric element 51 and the bottom 53 facing each other. The adhesive is then hardened by being heated, the mounting sleeve 60 being weighted down by a weight so that a defined layer of adhesive is attained. The layer of adhesive ensures the contact between the piezoelectric element 51 and diaphragm of the ultrasonic transducer 50 formed by the bottom 53 and it prevents the formation of a layer of air between these parts.

The potting compound 55 is then filled into the mounting sleeve 60 from above. This potting compound flows through openings provided therefor in the circuit board 54 also into the space between the circuit board 54 and the foamed material disk 56. The foamed material disk 56 prevents the potting compound 55 from coming into contact with the upper side of the piezoelectric element 51. The paws 65 which force the edge of the foamed material disk 56 onto the upper side of the piezoelectric element 51 prevent the potting compound 55 from creeping between the foamed material disk 56 and the piezoelectric element 51.

Serving installation of the pot-shaped transducer housing 52 in the sensor housing 22 is a mounting part 70 having a flange 71 on which a guide bush 72 is formed. The transducer housing 52 is pushed into the guide bush 72, the inner diameter of which corresponds to the outer diameter of the transducer housing 52 so that the transducer housing 52 is a sliding fit in the guide bush 72. The collar 57 on the transducer housing 52 prevents the transducer housing 52 from emerging from the guide bush 72. In the open end of the transducer housing 52 a spring cup 73 is inserted which in turn features a collar 74 supported by the end of the transducer housing 52. The spring cup 73 receives the one end of a coil compression spring 75. Running around the edge of the flange 71 is a collar 76, the inner diameter of which corresponds to the outer diameter of a carrier tube 77 formed on the transverse wall 45.

Prior to attaching the mounting part 70 to the carrier tube 77 a connecting lead 78, which is soldered to the circuit board 54 and is intended to connect the ultrasonic transducer 50 to the excitation and evaluation circuitry 14, is inserted through a tube socket 79 standing off from the transverse wall 45 to the opposing side. On the flange 71 a sealing ring 80 is placed to which the outer edge of an annular cuff 81 is secured, the inner edge of which is connected to an elastic ring 82 placed around the transducer housing 52. Then, the collar 76 is placed over the carrier tube 77 and the flange 71 is secured by means of screws 83 which are screwed into the thickened wall sections of the carrier tube 77 and of which one is to be seen in FIG. 4. The coil compression spring 75 is dimensioned so that it is compressed between the spring cup 73 and the transverse wall 45 to achieve a desired pretension when the mounting part 70 is secured to the carrier tube 77.

Following this, the connecting lead 78 can be soldered to the terminals provided on the circuit board 48, and the outer space 46 can be filled with a potting compound practically up to the level of the tube socket 79. The tube socket 79 prevents potting compound from flowing into the inner space 47.

The sensor block 20 is now fitted ready for operation and it can be secured to the adapter 21. For this purpose the guide bush 72 is inserted through an opening in the plate 30 of the adapter 21 so that the bottom of the transducer housing 52, i.e. the diaphragm 53 of the ultrasonic transducer 50, is in contact with the outer surface of the container wall 12. When the sensor block 20 is moved in the direction of the adapter 21, the transducer housing 52 is firmly held by the container wall 12 so that it is shifted into the guide bush 72, as a result of which the spring 75 is further compressed. Once, in conclusion, the sensor block 20 has been secured to the adapter 21 by means of the screw 26, the diaphragm 53 is urged against the container wall 12 by the force defined by the spring 75.

It will be appreciated from comparing the FIGS. 3, 4(a) and (b) that in applying the sensor 13 to a flat container wall 12 (FIG. 3) the ultrasonic transducer 50 protrudes further from the guide bush 72 than in the case of a curved container wall 12 (FIGS. 4(a) and (b)), the contact of the diaphragm 53 with the container wall 12 being assured in each case by the force defined by the spring 75.

In all ways of securing the adapter 21 it needs to be assured that the diaphragm, following fitting of the sensor block, is oriented parallel in the case of a flat container wall 12 and tangential and symmetrical in the case of a cylindrical container wall 12. This can only be achieved when the adapter is already correctly oriented on being fitted. In the FIGS. 9 and 10 a preferred embodiment of the adapter 21 is illustrated which satisfies this requirement.

In this embodiment spacers 85 are applied to the adapter 21 which dictate the spacing of the plate 30 away from the container wall 12 along two lines oriented parallel to the longitudinal sides of the adapter. The spacers 85 may be pins applied to the four corners of the plate 30, or also strips extending along the longitudinal sides of the frame 31. The spacers 85 ensure that the adapter 21 has a position which is defined with respect to the container wall 12 even when, in the case of the clamping strap attachment, the force acting on the one side is greater than the force acting on the other side, or when, in the case of attachment by threaded studs, the studs are not oriented straight or the forces exerted by the nuts are unequal.

Figure 9:
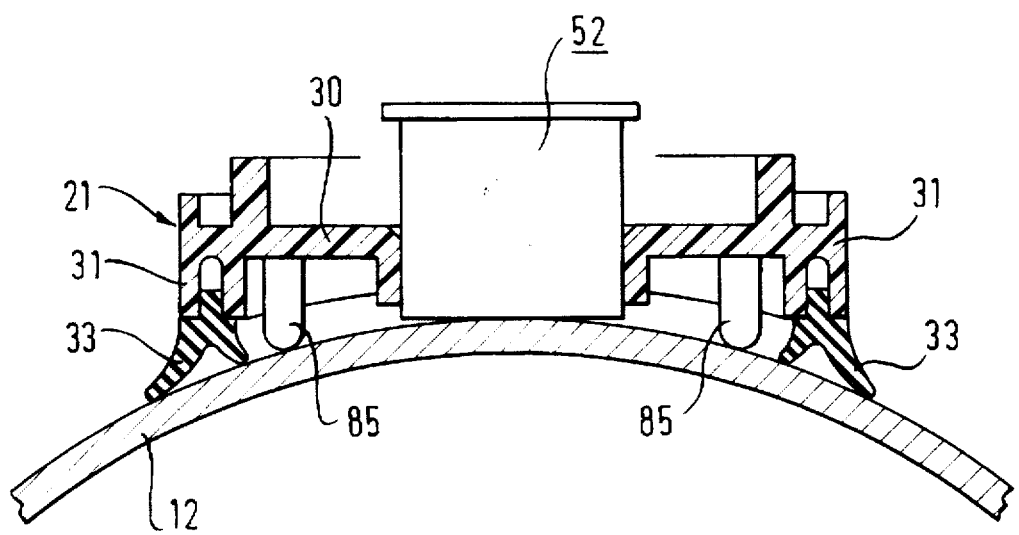
FIG. 9 shows a preferred embodiment of the adapter which is attached to a cylindrical container wall and FIG. 10 shows the adapter of FIG. 9 when attached to a flat container wall.
Figure 10:
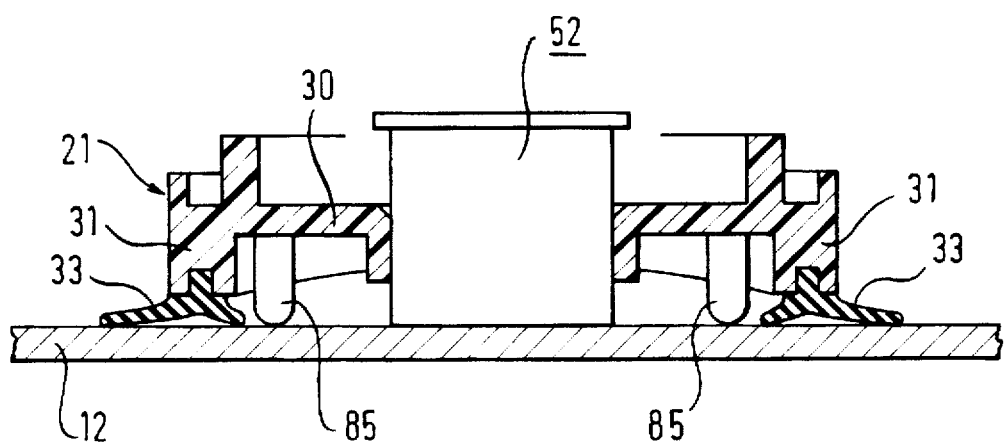

It will be appreciated from the transducer housing 52 depicted schematically to the container wall 12 in FIGS. 9 and 10 that due to the spacers 85 the diaphragm is oriented precisely tangential and symmetrical in the case of a cylindrical container wall 12 and, in the case of a flat container wall 12, it is in parallel contact with the container wall 12.

We claim:

1. A device for monitoring a predetermined level of a liquid in a container by means of an ultrasonic sensor fitted on the outer surface of the container wall at a measurement point situated at the height of the level to be monitored and containing an ultrasonic transducer having a diaphragm in contact with the container wall, comprising an adapter which is configured so that it can be secured to containers of differing shape and/or differing materials in any way required, and a sensor block which contains the components of the ultrasonic sensor including the ultrasonic transducer and is releasably connectable to the adapter while the adapter is secured to the container wall, the ultrasonic transducer being mounted axially displaceable in the sensor block so that it extends through an opening in the adapter towards the container wall when the sensor block is connected to the adapter the sensor block further comprising a spring biasing the ultrasonic transducer towards the container wall.

2. The device as set forth in claim 1, wherein said adapter comprises a frame adapted to the contour of said sensor block, which frame is provided on the side facing the container wall with a seal running around the periphery.

3. The device as set forth in claim 2, wherein said frame is rectangular and includes an arcuate recess on each of the two parallel transverse sides for adapting to a curved container wall.

4. The device as set forth in claim 3, wherein said seal is configured along each transverse side with a height which changes according to the depth of said recess, so that the sealing surface of said seal locates in a single plane in the relaxed condition.

5. The device as set forth in claim 4, wherein said seal includes two sealing lips separated by a notched recess and that the height of said sealing lips and the depth of said notched recess along each transverse side change according to the depth of said recess.

6. The device as set forth in claim 2, wherein said frame is applied around the periphery of a plate having an opening for through-guidance of said ultrasonic transducer.

7. The device as set forth in claim 6, wherein said plate is configured with passages for threaded studs secured to said container wall and that said adapter is secured to said container wall by nuts screwed onto said threaded studs.

8. The device as set forth in claim 1, wherein on said adapter a clamping device for securing said adapter to a rail secured to said container wall is attached.

9. The device as set forth in claim 1, wherein on said adapter fastener parts are attached for a clamping strap located around said container.

10. The device as set forth in claim 1, wherein on said adapter spacers are attached which define a precise location of the adapter with respect to the container wall.

11. The device as set forth in claim 10, wherein said spacers are pins attached to the four corners of said adapter.

12. The device as set forth in claim 10, wherein said spacers are strips which extend along the longitudinal sides of said adapter.

* * * * *

US005778726B1

(12) REEXAMINATION CERTIFICATE (4441st)

United States Patent
Müller et al.

(10) Number: US 5,778,726 C1
(45) Certificate Issued: Sep. 11, 2001

(54) DEVICE FOR MONITORING A PREDETERMINED LEVEL OF A LIQUID IN A CONTAINER

(75) Inventors: Roland Müller, Steinen; Winfried Maier, Maulburg; Rolf Schwald, Schopfheim, all of (DE)

(73) Assignee: Endress + Hauser GmbH + Co., Maulburg (DE)

Reexamination Request:
 No. 90/005,251, Mar. 15, 1999

Reexamination Certificate for:
 Patent No.: 5,778,726
 Issued: Jul. 14, 1998
 Appl. No.: 08/733,098
 Filed: Oct. 16, 1996

(30) Foreign Application Priority Data

Oct. 17, 1995 (DE) .............................. 195 38 677

(51) Int. Cl.⁷ .................................. G01F 23/00
(52) U.S. Cl. ............... 73/290 V; 181/124; 340/621; 367/165
(58) Field of Search ............. 73/290 V, 866.5; 340/618, 621; 367/157, 159, 162, 163, 165, 908; 181/124

(56) References Cited

U.S. PATENT DOCUMENTS

| 4,203,324 | * | 5/1980  | Baumoel           | 73/290 V |
| 4,242,744 | * | 12/1980 | Rottmar           | 367/173  |
| 4,850,213 | * | 7/1989  | Steinebrunner et al. | 73/290 V |
| 5,363,341 | * | 11/1994 | Schwald et al.    | 73/290 V |
| 5,438,868 | * | 8/1995  | Holden et al.     | 367/908  |

* cited by examiner

Primary Examiner—Hezron E. Williams

(57) ABSTRACT

For monitoring a predetermined level of a liquid in a container an ultrasonic sensor is fitted on the outer surface of the container wall at a measurement point situated at the height of the level to be monitored, said sensor containing an ultrasonic transducer having a diaphragm in contact with the container wall. The components of the ultrasonic sensor including those of the ultrasonic transducer are grouped together in a sensor block which is releasably connected to an adapter secured to the container wall, this adapter being configured so that it can be secured in any way required to containers of differing shape and/or material.

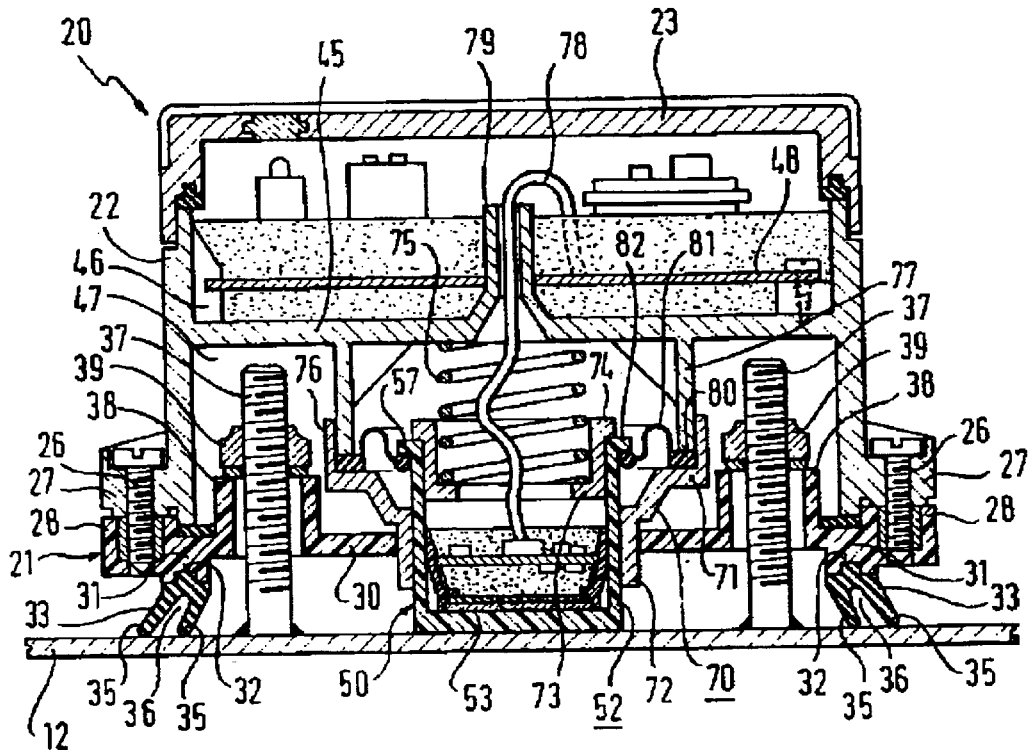

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6 and 8–12 are cancelled.

Claims 3 and 7 are determined to be patentable as amended.

Claims 4 and 5, dependent on an amended claim, are determined to be patentable.

3. [The] *A* device [as set forth in claim 2,] *for monitoring a predetermined level of a liquid in a container by means of an ultrasonic sensor fitted on the outer surface of the container wall at a measurement point situated at the height of the level to be monitored and containing an ultrasonic transducer having a diaphragm in contact with the container wall, comprising an adapter which is configured so that it can be secured to containers of differing shape and/or differing materials in any way required, and a sensor block which contains the components of the ultrasonic sensor including the ultrasonic transducer and is releasably connectable to the adapter while the adapter is secured to the container wall, the ultrasonic transducer being mounted axially displaceable in the sensor block so that it extends through an opening in the adapter towards the container wall when the sensor block is connected to the adapter the sensor block further comprising a spring biasing the ultrasonic transducer towards the container wall,* wherein said adapter comprises a frame adapted to the contour of said sensor block, which frame is provided on the side facing the container wall with a seal running around the periphery, wherein said frame is rectangular and includes an arcuate recess on each of the two parallel transverse sides for adapting to a curved container wall.

7. [The] *A* device [as set forth in claim 6,] *for monitoring a predetermined level of a liquid in a container by means of an ultrasonic sensor fitted on the outer surface of the container wall at a measurement point situated at the height of the level to be monitored and containing an ultrasonic transducer having a diaphragm in contact with the container wall, comprising an adapter which is configured so that it can be secured to containers of differing shape and/or differing materials in any way required, and a sensor block which contains the components of the ultrasonic sensor including the ultrasonic transducer and is releasably connectable to the adapter while the adapter is secured to the container wall, the ultrasonic transducer being mounted axially displaceable in the sensor block so that it extends through an opening in the adapter towards the container wall when the sensor block is connected to the adapter the sensor block further comprising a spring biasing the ultrasonic transducer towards the container wall,*

*wherein said adapter comprises a frame adapted to the contour of said sensor block, which frame is provided on the side facing the container wall with a seal running around the periphery,*

*wherein said frame is applied around the periphery of a plate having an opening for through-guidance of said ultrasonic transducer,* wherein said plate is configured with passages for threaded studs secured to said container wall and that said adapter is secured to said container wall by nuts screwed onto said threaded studs.

\* \* \* \* \*